United States Patent
Shiozaki et al.

(10) Patent No.: US 8,338,750 B2
(45) Date of Patent: Dec. 25, 2012

(54) AC PULSE ARC WELDING CONTROL METHOD

(75) Inventors: Hideo Shiozaki, Osaka (JP); Futoshi Nishisaka, Osaka (JP); Norihito Takahashi, Osaka (JP); Toshiro Uezono, Osaka (JP); Hiroyasu Mondori, Osaka (JP); Shugo Hirota, Osaka (JP); Shinichiro Nakagawa, Osaka (JP); Tomoyuki Ueyama, Osaka (JP)

(73) Assignee: DAIHEN Corporation, Osaka (JP)

( * ) Notice: Subject to any disclaimer, the term of this patent is extended or adjusted under 35 U.S.C. 154(b) by 455 days.

(21) Appl. No.: 12/640,776

(22) Filed: Dec. 17, 2009

(65) Prior Publication Data

US 2010/0155383 A1 Jun. 24, 2010

(30) Foreign Application Priority Data

Dec. 24, 2008 (JP) ................................ 2008-327635
Mar. 10, 2009 (JP) ................................ 2009-055908

(51) Int. Cl.
*B23K 9/10* (2006.01)

(52) U.S. Cl. ........... 219/130.51; 219/130.5; 219/130.33; 219/125.12; 219/137.71

(58) Field of Classification Search ............ 219/130.5, 219/130.51, 130.33, 125.12, 137.71
See application file for complete search history.

(56) References Cited

U.S. PATENT DOCUMENTS

| 6,215,100 | B1 * | 4/2001 | Stava ..................... 219/130.51 |
| 6,376,802 | B1 * | 4/2002 | Tong et al. .............. 219/137 PS |
| 6,600,135 | B2 | 7/2003 | Tong |
| 7,842,903 | B2 * | 11/2010 | Myers ..................... 219/130.51 |
| 2005/0284854 | A1 * | 12/2005 | Tong et al. .............. 219/130.51 |
| 2007/0246448 | A1 | 10/2007 | Nishisaka et al. |
| 2008/0156781 | A1 * | 7/2008 | Artelsmair et al. ........ 219/130.5 |

FOREIGN PATENT DOCUMENTS

| JP | 2002-86271 | 3/2002 |
| JP | 2007-283393 | 11/2007 |
| WO | WO2006/089322 | 8/2006 |

\* cited by examiner

*Primary Examiner* — Toan Le
(74) *Attorney, Agent, or Firm* — Hamre, Schumann, Mueller & Larson, P.C.

(57) ABSTRACT

A control method for AC pulse arc welding performed upon application of cyclic AC welding current is provided. The welding current has a cycle including an electrode negative polarity period and an electrode positive polarity period subsequent to the electrode negative polarity period. In the control method, an electrode negative polarity base current and a subsequent electrode negative polarity peak current are applied during the electrode negative polarity period. The electrode negative polarity base current has an absolute value smaller than a first critical value, and the electrode negative polarity peak current has an absolute value greater than the first critical value. Then, an electrode positive polarity peak current is applied during the electrode positive polarity period. The electrode positive polarity peak current has a value greater than a second critical value.

12 Claims, 9 Drawing Sheets

AC PULSE ARC WELDING CONTROL METHOD

BACKGROUND OF THE INVENTION

1. Field of the Invention

The present invention relates to a method for controlling AC pulse arc welding, by which stable welding is performed even when an electrode negative polarity current ratio is high.

2. Description of the Related Art

AC pulse arc welding proceeds by repeating cycles each consisting of an electrode positive polarity period (in which a peak current and a base current are applied) and an electrode negative polarity period (in which a base current is applied). In AC pulse arc welding, it is possible to adjust the amount of heat inputted to the base metal by adjusting the electrode negative polarity period, thereby varying the electrode negative polarity current ratio. As a result, welding with low-heat input can be performed, which enables high-quality welding with respect to thin plates. The capability of varying the electrode negative polarity current ratio also makes it possible to optimize penetration depth, weld reinforcement height, and other bead shape factors, depending on the work. Hereinafter, a conventional method of AC pulse arc welding (see Japanese Laid-open Patent Publications No. 2002-86271 and 2007-283393, for example) will be described.

Figure 9:
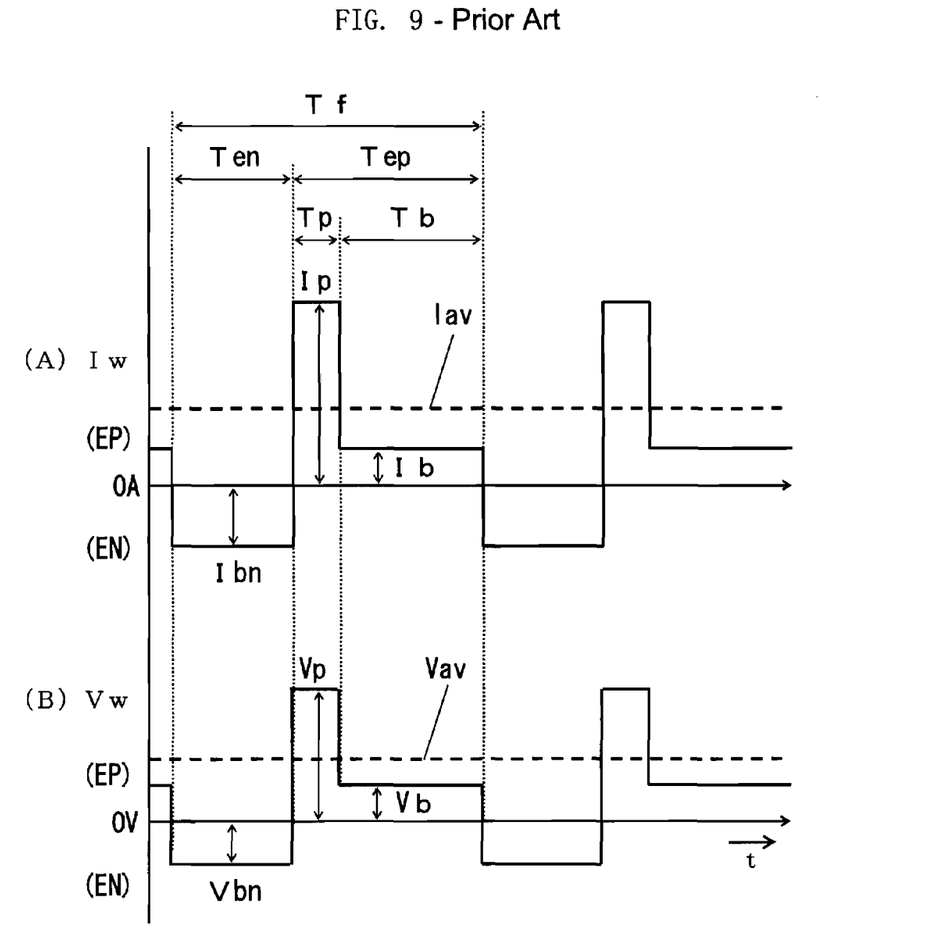
FIG. 9 is a current and voltage waveform chart illustrating for conventional AC pulse arc welding.

FIG. 9 is a waveform chart of typical electric current and voltage used in AC pulse arc welding. FIG. 9(A) shows a welding current Iw whereas FIG. 9(B) shows a welding voltage Vw. In FIGS. 9(A) and (B), the upper sides above 0 A and 0 V represent the electrode positive polarity (EP) state, while the lower sides below 0 A and 0 V represent the electrode negative polarity (EN) state. The welding wire is fed at a predetermined wire feeding rate. In switching the polarity from one to the other, a high voltage of a several hundred volts is applied across the welding wire and the base metal for a very short period of time in order to prevent the breakage of the arc.

As shown in FIGS. 9(A) and (B), during the electrode negative polarity period Ten, a predetermined base current Ibn flows, and a predetermined base voltage Vbn is applied. The electrode negative polarity base current Ibn is set to be 20-200 A, for example, which is lower than a critical value in order to avoid droplet formation at the tip of the welding wire. The critical value is defined as the value of a welding current at which the welding wire's droplet transfer state changes to a spray transfer state. The critical value depends upon, for example, the material of the welding wire and the kind of the shielding gas employed. For instance, the critical value may be about 350 A for aluminum wire (shielding gas: argon), which is often used in AC pulse arc welding. For steel wire (shielding gas: a mixture of argon gas 80% and carbon dioxide gas 20%), the critical value may be about 450.

The electrode positive polarity period Tep is divided into a peak period Tp and a base period Tb. During the peak period Tp, as shown in FIGS. 9(A) and (B), a predetermined peak current Ip, larger than the critical value, is caused to flow upon application of a peak voltage Vp, in order to achieve the transfer of a droplet. The peak period Tp and the peak current Ip are so adjusted as to attain so-called "1 pulse-1 droplet" transfer, that is, a single droplet is transferred to the molten pool upon a single application of peak current Ip in one cycle. This ensures stable welding. During the base period Tb, a predetermined base current Ib, smaller than the critical value, is caused to flow upon application of a base voltage Vb, so as not to form a droplet. The base current Ib may be 20-80 A, for example.

One pulse cycle Tf is made up of the above-described electrode negative polarity period Ten, peak period Tp and base period Tb, and the welding is performed by repeating the cycle Tf. The electrode negative polarity period Ten and the peak period Tp are predetermined period, whereas the base period Tb is a period determined by feedback control performed for optimizing the arc length. In the arc length control, the length of the base period Tb is controlled so that an average value Vav of the absolute value of the welding voltage Vw in FIG. 9(B) is equal to a predetermined voltage setting value.

The formation and transfer of a droplet in AC pulse arc welding will be summarized as follows. A droplet transfer occurs around the end of the peak period Tp (i.e. immediately before, exactly at, or immediately after the end of the peak period Tp). Then, during the subsequent period of base period Tb, a base current Ib which has a small current value lower than the critical value is applied, so that the tip of the welding wire hardly melts and no droplet is formed. During the subsequent electrode negative polarity period Ten, an electrode negative polarity base current Ibn, smaller than the critical value, is caused to flow. Though having an equally small value, the electric current has a greater capability of melting the welding wire tip in the electrode negative (EN) polarity state than in the electrode positive (EP) polarity state. However, the electrode negative polarity period Ten is a short period because AC pulse arc welding is typically performed with the electrode negative polarity current ratio lying in a range of 0 through 30%. Therefore, only a small part of the welding wire will melt, resulting in the formation of a very small droplet. During the subsequent period of peak period Tp, a peak current Ip, larger than the critical value, is caused to flow. Accordingly, the welding wire tip melts enough to form a substantially large droplet. At this stage, the applied peak current Ip generates an electromagnetic force or pinch that acts on an upper portion of the droplet, thereby producing a constricted part or a neck in the droplet. Then, around the end of the peak period Tp, the constricted part becomes much thinner, and finally the droplet is transferred to the molten pool. In DC pulse arc welding, the formation and transfer of a droplet also takes place during the peak period Tp. As described above, by achieving the 1 pulse-1 droplet transfer (i.e. one droplet transfer takes place each cycle), a stable welding state is produced, and high-quality welding will result.

The electrode negative polarity current ratio Ren(%) is defined as follows:

$$Ren = ((Ten \cdot |Ibn|)/(Ten \cdot |Ibn| + Tp \cdot Ip + Tb \cdot Ib)) \times 100$$

As seen from this formula, the ratio Ren represents the proportion of welding current during the electrode negative polarity with respect to an average value of welding current absolute values.

In the mathematical expression given above, the peak current Ip and the base current Ib are predetermined values, and so is the peak period Tp. The base period Tb can be regarded as a predetermined constant under a normal state where the arc length has an appropriate value. Therefore, it is possible to adjust the ratio Ren by adjusting the electrode negative polarity period Ten and/or the electrode negative polarity base current Ibn. Depending on the ratio Ren, the states of the penetration and reinforcement will vary, resulting in changes in the bead shape.

As described above, in AC pulse arc welding, it is common to choose an appropriate value from a range of 0 through 30% for the electrode negative polarity current ratio, depending on the work. A 0% electrode negative polarity current ratio means DC pulse arc welding. The electrode negative polarity current ratio selected from the above range does not cause the droplet to grow too large in the electrode negative polarity period Ten, and it is therefore possible to achieve a droplet formation and transfer in the peak period Tp.

However, depending on the work, it is necessary to achieve smaller penetration and larger reinforcement, i.e. it is necessary to form a bead shape with a low dilution rate. An example of such a case is when high-speed welding is performed with respect to thin steel plates with a large gap present at the welding joint. In this case, a bead shape with a low dilution rate is required in order to fill the gap with the molten metal while attaining a small penetration. In order to form such a bead shape, the ratio Ren needs to be set to a value which is beyond the above-described normal range, i.e. over 30%, or even over 50%. Conventionally, the ratio Ren can be set to a high value by setting the electrode negative polarity period Ten and/or the electrode negative polarity base current Ibn to a large value. As a result of this, the welding wire tip melts during the electrode negative polarity period Ten, and a large droplet is formed. In this state, the welding process goes into the peak period Tp, and the droplet grows much larger during the peak period Tp. Such a large droplet, however, cannot be transferred completely, and some molten part will remain on the welding wire tip even at the end of the peak period Tp. This residual droplet affects the transfer of the next droplet, making it impossible to attain the 1 pulse-1 droplet transfer. In other words, the droplet transfer occurs at random, and the welding state becomes unstable.

SUMMARY OF THE INVENTION

It is therefore an object of the present invention to provide an AC pulse arc welding control method which is capable of providing a stable welding state even when the electrode negative polarity current ratio is set to a larger value beyond the conventional normal range.

According to the present invention, there is provided a control method for AC pulse arc welding performed upon application of cyclic AC welding current. The welding current has a predetermined cycle including an electrode negative polarity period and an electrode positive polarity period subsequent to the electrode negative polarity period. The control method comprises the steps of: applying an electrode negative polarity base current and a subsequent electrode negative polarity peak current during the electrode negative polarity period, where the electrode negative polarity base current has an absolute value smaller than a first critical value, and the electrode negative polarity peak current has an absolute value greater than the first critical value; and applying an electrode positive polarity peak current during the electrode positive polarity period, where the electrode positive polarity peak current has a value greater than a second critical value.

Preferably, the control method of the present invention may further comprise the step of applying an electrode positive polarity base current subsequent to the electrode positive polarity peak current during the electrode positive polarity period, where the electrode positive polarity base current has a value smaller than the second critical value.

Preferably, at least one of the electrode negative polarity peak period and the electrode negative polarity peak current may be adjusted for varying a predetermined electrode negative polarity current ratio.

Preferably, the electrode negative polarity peak current may comprise an oscillating current having a predetermined amplitude and a predetermined oscillation frequency.

Preferably, the electrode negative polarity peak current may have a square-shaped oscillation waveform.

Other features and advantages of the present invention will become apparent from the detailed description given below with reference to the accompanying drawings.

DETAILED DESCRIPTION OF THE PREFERRED EMBODIMENT

Preferred embodiments of the present invention will be described below with reference to the accompanying drawings.

Figure 1:
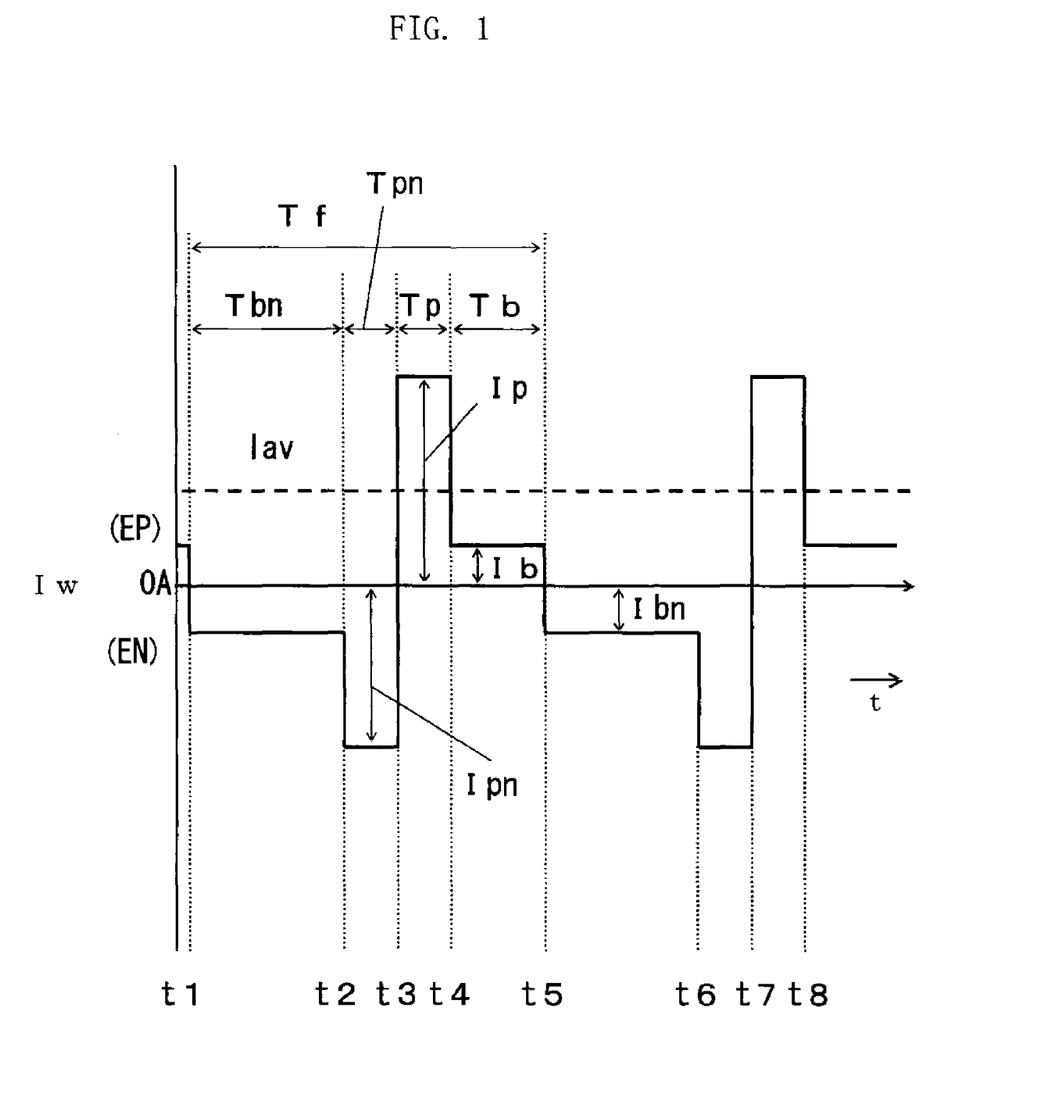
FIG. 1 is a welding current waveform chart for illustrating an AC pulse arc welding control method according to a first embodiment of the present invention.

FIG. 1 is a welding current waveform chart of a welding current Iw for illustrating an AC pulse arc welding control method according to a first embodiment of the present invention. In FIG. 1, the upper side above 0 A corresponds to the electrode positive polarity EP, while the lower side corresponds to the electrode negative polarity EN. In the illustrated case, an electrode negative polarity current ratio (to be noted below) is set to a higher value greater than the maximum value lying in a normal range (typically, 0 through 30%). In the present embodiment, as noted below, the prevention of arc breakage in polarity switching is attained by applying high voltage across the welding wire and the base metal for a very short period of time.

During an electrode negative polarity base period Tbn from time t1 to time t2, an electrode negative polarity base current Ibn the absolute value of which is smaller than a critical value (more precisely, a critical value for negative polarity) is applied. During an electrode negative polarity peak period Tpn from time t1 to time t2, an electrode negative polarity peak current Ipn the absolute value of which is greater than the critical value is applied.

Then, the polarity is reversed at time t3. During an electrode positive polarity peak period Tp from time t1 to time t2, an electrode positive polarity peak current Ip which has a value not smaller than a critical value (a critical value for positive polarity, which may be equal or not equal to the above-mentioned critical value for negative polarity) is applied. During an electrode positive polarity base period Tb from time t1 to time t2, an electrode positive polarity base current Ib which has a value smaller than the critical value for positive polarity is applied. From time t5 to time t6, the process is in the (second) electrode negative polarity base period Tbn. From time t6 to time t7, the process is in the (second) electrode negative polarity peak period Tpn. From time t7 to time t8, the process is in the (second) electrode positive polarity peak period Tp. The term from time t1 to t5 corresponds to one pulse cycle Tf. In the pulse cycle Tf, the term from time t1 to time t3 corresponds to the electrode negative polarity period Ten.

The electrode positive polarity peak period Tp and the electrode negative polarity peak period Tpn are preset to appropriate lengths of time. The electrode positive polarity peak current Ip, the electrode negative polarity peak current Ipn, the electrode negative polarity base current Ibn and the electrode positive polarity base current Ib are preset to appropriate values. A feedback control (arc length control) is performed to adjust the length of the pulse cycle Tf, so that an average of the absolute values of the welding voltages will be equal to a predetermined set value. To change the pulse cycle Tf, the electrode positive polarity base period Tb or the electrode negative polarity base period Tbn is varied in accordance with the feedback control. When the electrode positive polarity base period Tb is subject to the feedback control, the electrode negative polarity base period Tbn is kept to an appropriate fixed value. When the electrode negative polarity base period Tbn is subject to the feedback control, the electrode positive polarity base period Tb is kept to an appropriate fixed value. In the embodiment depicted in FIG. 1, the electrode negative polarity current ratio Ren is given by the following formula:

$$Ren = ((Tpn \cdot |Ipn| + Tbn \cdot |Ibn|)/(Tp \cdot Ip + Tpn \cdot |Ipn| + Tbn \cdot |Ibn| + Tb \cdot Ib)) \times 100$$

FIG. 1 shows a case where the electrode positive polarity peak current Ip and the electrode negative polarity peak current Ipn have a sharp rise and a sharp fall, namely, a case of a squire wave. However, these peak currents may be given a predetermined gradient when they rise and/or fall, so as to make a trapezoidal wave. Using a trapezoidal waveform for these peak currents is advantageous in AC pulse arc welding performed on aluminum materials, which require milder arc strength for reduced spatter generation.

Next, the droplet formation and transfer will be described with reference to FIG. 1. A droplet transfer takes place around time t4 (immediately before, exactly at, or immediately after time t4) i.e. the end of the electrode positive polarity peak period Tp. During the electrode positive polarity base period Tb from time t4 to time t5, the applied current has a small value which is lower than the critical value (indicated by the horizontal broken line). Thus, the tip of the welding wire melts only little, which results in substantially no formation of a droplet.

Then, a droplet is formed during the electrode negative polarity base period Tbn from time t5 to time t6, though the electrode negative polarity base current Ibn has an absolute value smaller than the critical value for negative polarity. Such formation of a droplet is possible because the electrode negative polarity base period Tbn is set to have a long duration (due to a high electrode negative polarity current ratio) and therefore the melting of the welding wire tip is facilitated in the electrode negative polarity EN, even with a small base current Ibn.

During the electrode negative polarity peak period Tpn from time t6 to time t7, the droplet on the tip of the welding wire grows more due to the application of a current greater than the critical value. Around the end of the period Tpn, the droplet is locally constricted and a neck is begun to form, but still no transfer of the droplet occurs at this stage due to the large size of the droplet.

During the electrode positive polarity peak period Tp from time t6 to time t7, a current larger than the critical value (for positive polarity) is applied, and induces a strong electromagnetic pinch on the neck of the droplet. This causes the neck to become much thinner rapidly, resulting in the transfer of the droplet. The size of the transferring droplet is greater than that of a droplet that would be formed in DC pulse arc welding or in AC pulse arc welding performed with a normal electrode negative current ratio. This large-sized droplet is pushed toward the molten pool by a strong arc force due to the large peak current Ip, and therefore the transfer causes no significant spatter.

As described above, when the electrode negative polarity current ratio is set to a large value, a droplet is begun to form in the electrode negative polarity base period Tbn, and the size of the droplet to be transferred in a peak period is large. In the light of this, the first embodiment of the present invention provides two successive peak periods, i.e., the electrode negative polarity peak period Tpn and the electrode positive polarity peak period Tp that follows the period Tpn without interruption. With such two peak periods opposite in polarity, the transfer of a large-sized droplet can be performed properly, and the electrode negative polarity current ratio Ren can easily be set to a large value. To change the ratio Ren, when the electrode positive polarity base period Tb is subject to the feedback control, one or more electrode-negative-polarity factors among the peak period Tpn, the peak current Ipn, the base period Tbn and the base current Ibn will be varied. Likewise, when the electrode negative polarity base period Tbn is subject to the feedback control, one or more of the peak period Tpn, the peak current Ipn and the base current Ibn will be varied. For setting the electrode negative polarity current ratio Ren to a higher value beyond the normal range, it may be preferable to adjust one or both of the electrode negative polarity peak period Tpn and the electrode negative polarity peak current Ipn.

Figure 2:
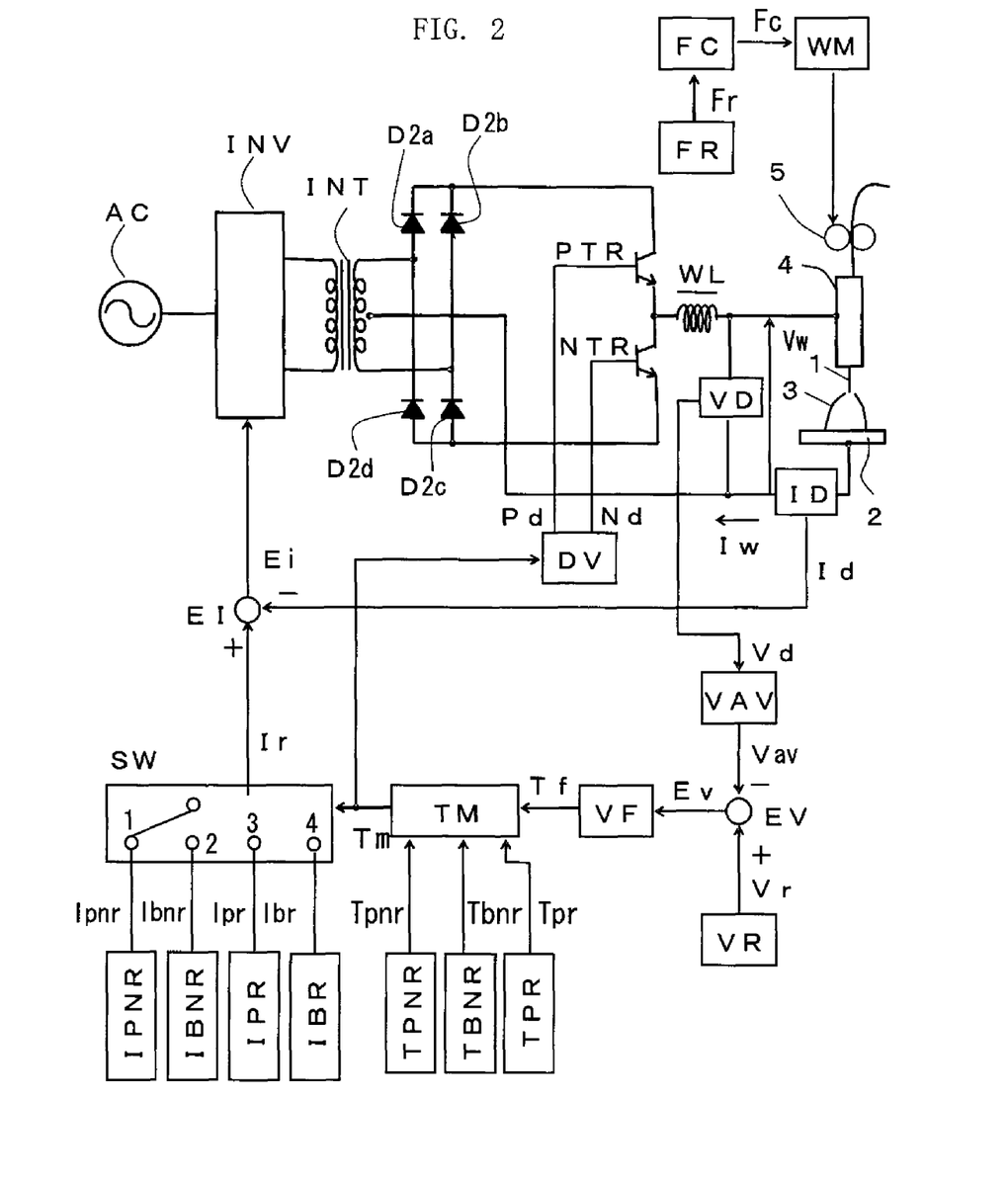
FIG. 2 is a block diagram of a welding power source used for the first embodiment the present invention.

FIG. 2 is a block diagram of a welding power source for implementing the above-described AC pulse arc welding control method according to the first embodiment of the present invention. The illustrated system is arranged for a case where the electrode positive polarity period Tb is subject to the feedback control. Though not shown in the figure, a circuit for high-voltage application at the time of polarity switching described above is one component of the system.

An inverter circuit INV is connected to a commercial AC power source (three-phase 200 volts, for example). The alternating current from the power source is rectified and smoothed to be direct current. The inverter circuit INV performs inverter control (pulse width modulation control) on the direct current, based on a current error amplification signal Ei (to be described later), and outputs high-frequency alternating current. An inverter transformer INT reduces the voltage of the high-frequency AC to a voltage suitable to the arc welding. Secondary rectifiers D2a-D2d rectify the reduced high-frequency alternating current to direct current. An electrode positive polarity transistor PTR is turned on by an electrode positive polarity drive signal Pd (to be described later). In this ON state, the output from the welding power source has the electrode positive polarity EP. On the other hand, when an electrode negative polarity transistor NTR is turned on by an electrode negative polarity drive signal Nd (to be described later), the output from the welding power source has the electrode negative polarity EN. A reactor WL smoothes rippled signals. A welding wire 1, driven by feed rollers 5 connected to a wire feeding motor WM, is fed through a welding torch 4. An arc 3 is generated between the tip of the welding wire 1 and a base metal 2.

A voltage detection circuit VD detects welding voltage Vw to output a voltage detection signal Vd. A voltage averaging circuit VAV averages the absolute value of a voltage detection signal Vd, and outputs a voltage average signal Vav. A voltage setting circuit VR outputs a predetermined voltage setting signal Vr. A voltage error amplification circuit EV amplifies the error between the voltage setting signal Vr and the average voltage signal Vav, and outputs a voltage error amplification signal Ev. A voltage-frequency conversion circuit VF produces a signal whose frequency is proportional to the voltage error amplification signal Ev, and outputs a pulse cycle signal Tf which instantaneously assumes High level correspondingly to the frequency of the produced signal.

The electrode positive polarity peak period setting circuit TPR outputs a predetermined electrode positive polarity peak period setting signal Tpr. The electrode negative polarity peak period setting circuit TPNR outputs a predetermined electrode negative polarity peak period setting signal Tpnr. The electrode negative polarity base period setting circuit TBNR outputs a predetermined electrode negative polarity base period setting signal Tbnr. The timer circuit TM receives the pulse cycle signal Tf, the electrode positive polarity peak period setting signal Tpr, the electrode negative polarity peak period setting signal Tpnr and the electrode negative polarity base period setting signal Tbnr, and outputs a timer signal Tm. The timer signal Tm is produced each time the pulse cycle signal Tf makes its momentary level change to High. The timer signal Tm has a value 1 during a period determined by the electrode negative polarity base period setting signal Tbnr, a value 2 during a period determined by the electrode negative polarity peak period setting signal Tpnr, a value 3 during a period determined by the electrode positive polarity peak period setting signal Tpr, and a value 4 in the subsequent electrode positive polarity base period.

An electrode positive polarity peak current setting circuit IPR outputs a predetermined electrode positive polarity peak current setting signal Ipr. An electrode negative polarity peak current setting circuit IPNR outputs a predetermined electrode negative polarity peak current setting signal Ipnr. An electrode negative polarity base current setting circuit IBNR outputs a predetermined electrode negative polarity base current setting signal Ibnr. An electrode positive polarity base current setting circuit IBR outputs a predetermined electrode positive polarity base current setting signal Ibr.

A switching circuit SW receives the timer signal Tm, the electrode positive polarity peak current setting signal Ipr, the electrode negative polarity peak current setting signal Ipnr, the electrode negative polarity base current setting signal Ibnr and the electrode positive polarity base current setting signal Ibr. Based on these input signals, the switching circuit SW outputs an electric current setting signal Ir, which is: the electrode negative polarity base current setting signal Ibnr when the timer signal Tm=1; the electrode negative polarity peak current setting signal Ipnr when the timer signal Tm=2; the electrode positive polarity peak current setting signal Ipr when the timer signal Tm=3; and the electrode positive polarity base current setting signal Ibr when the timer signal Tm=4.

A current detection circuit ID detects the absolute value of the welding current Iw to output a current detection signal Id. A current error amplification circuit EI amplifies the error between the current setting signal Ir and the current detection signal Id, and outputs a current error amplification signal Ei.

The drive circuit DV receives the timer signal Tm, and outputs the electrode negative polarity drive signal Nd when the timer signal Tm=1 or 2; and the electrode positive polarity drive signal Pd when the timer signal Tm=3 or 4. Due to these outputs, electrode negative polarity is assigned to the electrode negative polarity base period and the electrode negative polarity peak period, while electrode positive polarity is assigned to the electrode positive polarity peak period and to the electrode positive polarity base period. A feeding rate setting circuit FR outputs a predetermined feeding rate setting signal Fr. A feeding control circuit FC receives the feeding rate setting signal Fr, and outputs a feeding control signal Fc to the wire feeding motor WM. Thus, the welding wire 1 is fed at a rate corresponding to the feeding control signal Fc.

Figure 3:
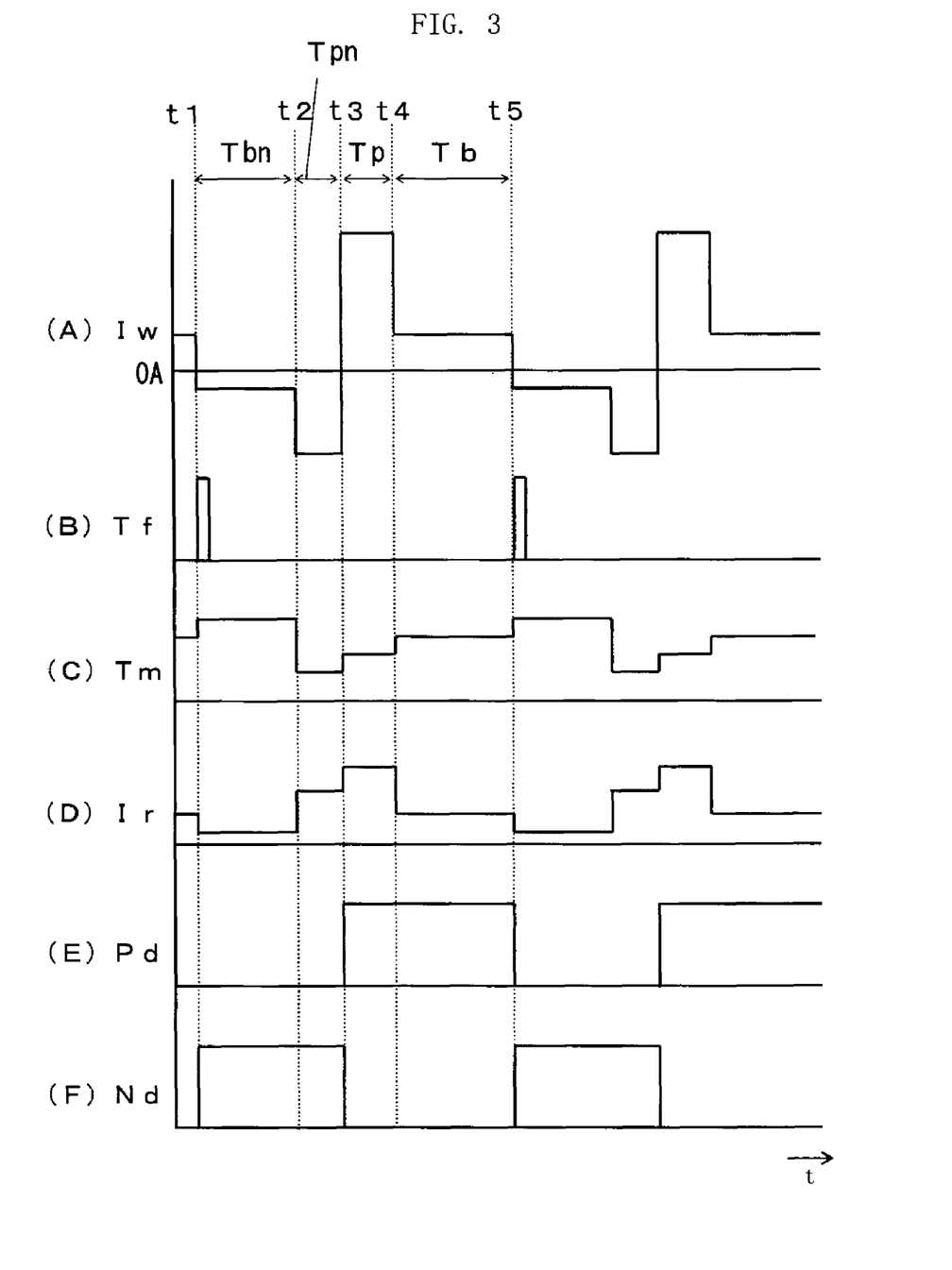
FIG. 3 is a signal timing chart for the welding power source in FIG. 2.

FIG. 3 is a timing chart showing the signals of the welding power source described above with reference to FIG. 2. In this figure, (A) illustrates the welding current Iw, (B) the pulse cycle signal Tf, (C) the timer signal Tm, (D) the current setting signal Ir, (E) the electrode positive polarity drive signal Pd, and (F) the electrode negative polarity drive signal Nd.

As shown in FIG. 3(A), a period before time t1 is an electrode positive polarity base period Tb; a period from time t1 to time t2 is an electrode negative polarity base period Tbn; a period from time t2 to time t3 is an electrode negative polarity peak period Tpn, a period from time t3 to time t4 is an electrode positive polarity peak period Tp; a period from time t4 to time t5 is an electrode positive polarity base period Tb; and a period after time t5 is an electrode negative polarity base period Tbn. As shown in FIG. 3(B), the pulse cycle signal Tf is a trigger signal which assumes High level instantaneously at time t1 and time t5. The term from time t1 to time t5 represents the pulse cycle. As shown in FIG. 3(C), the timer signal Tm has a value 1 at time t1 (when the pulse cycle signal Tf assumes High level) and remains for a period determined by the electrode negative polarity base period setting signal Tbnr in FIG. 2 (from time t1 to time t2). Thereafter, the timer signal Tm has: a value 2 from time t2 for a period determined by the electrode negative polarity peak period setting signal Tpnr in FIG. 2 (from time t2 to time t3); a value 3 from time t3 for a period determined by the electrode positive polarity peak period setting signal Tpr in FIG. 2 (from time t3 to time t4); and a value 4 from time t4 to time t5, i.e. for a period until the pulse cycle signal Tf assumes High level. At time t5, the timer signal Tm returns to a value 1. As seen from this, during the electrode positive polarity base period before time t1, the timer signal Tm has a value 4. The change of the values of the timer signal Tm is illustrated by a stepped pattern.

As shown in FIG. 3(D), the current setting signal Ir changes in accordance with the value of the timer signal Tm. Specifically, the value of the current setting signal Ir is equal to that of: the electrode positive polarity base current setting signal Ibr before time t1; the electrode negative polarity base current setting signal Ibnr from time t1 to time t2; the electrode negative polarity peak current setting signal Ipnr from time t2 to time t3; the electrode positive polarity peak current setting signal Ipr from time t3 to time t4; the electrode positive polarity base current setting signal Ibr from time t4 to time t5; and the electrode negative polarity base current setting signal Ibnr for a period after time t5. All the values of the current setting signal Ir are positive.

As shown in FIG. 3(E), the electrode positive polarity drive signal Pd is outputted for the period from time t3 to time t5 (and a period before time t1) to turn on the electrode positive polarity transistor PTR (see FIG. 2). As shown in FIG. 3(F), the electrode negative polarity drive signal Nd is outputted for the period from time t1 to time t3 (and a period after time t5) to turn on the electrode negative polarity transistor NTR (see FIG. 2).

FIG. 2 and FIG. 3 illustrate the case where the electrode positive polarity base period Tb is subject to the feedback control. Essentially the same explanation applies to a case where the electrode negative polarity base period Tbn is subject to the feedback control.

The first embodiment described above employs two peak periods: the electrode negative polarity peak period and the electrode positive polarity peak period. This enables the electrode negative polarity current ratio to be set to a large value, and to achieve the 1 pulse-1 droplet transfer, even with the large value of the electrode negative polarity current ratio. Accordingly, it is possible to perform high-quality welding and form beads with a low dilution rate.

Figure 4:
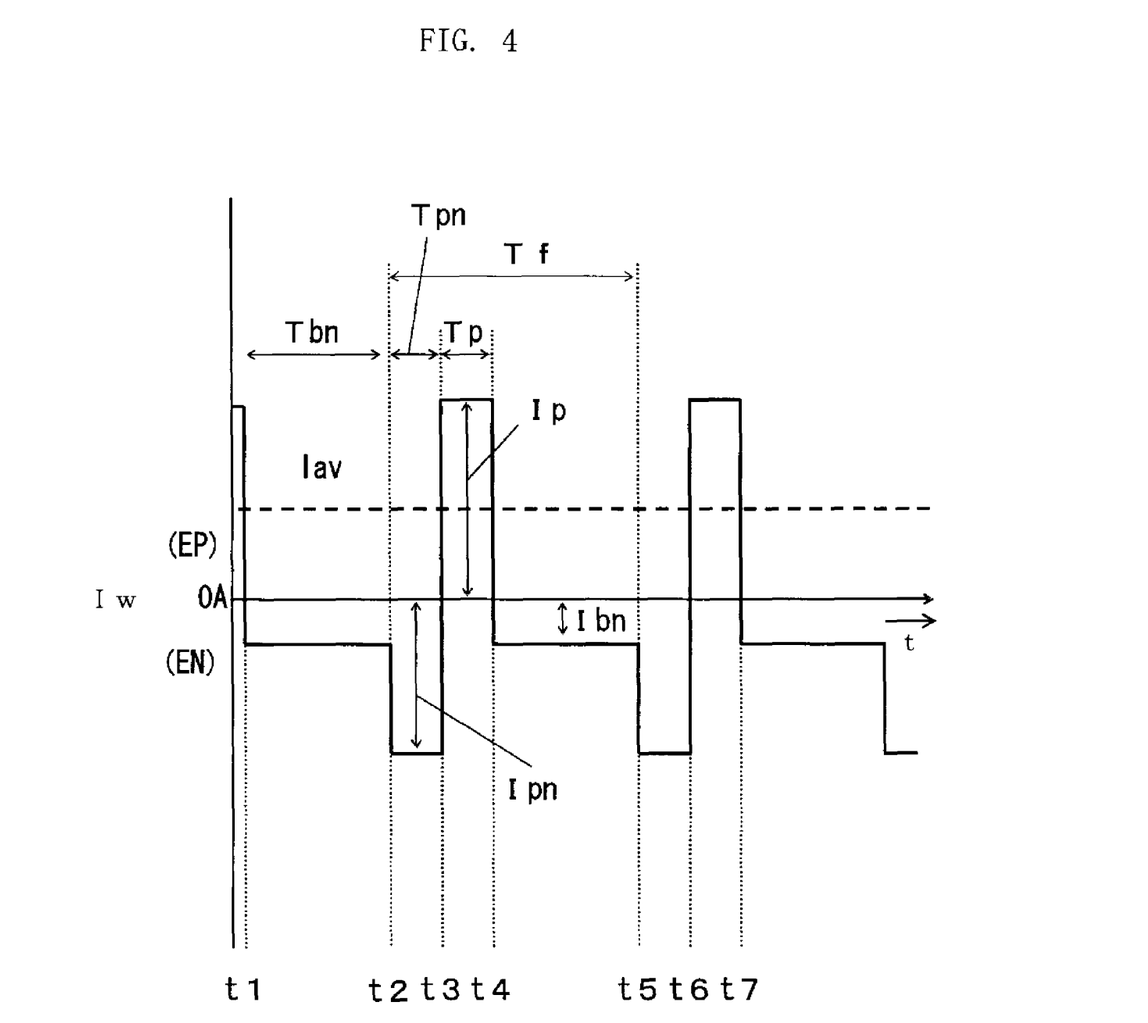
FIG. 4 is a welding current waveform chart for illustrating an AC pulse arc welding control method according to a second embodiment of the present invention.

FIG. 4 is a welding current waveform chart of a welding current Iw for illustrating an AC pulse arc welding control method according to a second embodiment of the present invention. In FIG. 4, the upper side above 0 A corresponds to the electrode positive polarity EP, while the lower side below 0 A corresponds to the electrode negative polarity EN. FIG. 4 shows a case where an electrode negative polarity current ratio (to be noted below) is set to a higher value than that of the first embodiment depicted in FIG. 1. In the second embodiment, as seen from FIG. 4, no electrode positive polarity base period (the period Tb in FIG. 1) is provided in the cycle. On the other hand, an electrode negative polarity peak period Tpn and an electrode positive polarity peak period Tp are substantially the same as those in the first embodiment. As described below, the electrode negative polarity base period Tbn is different from that of the first embodiment.

During the electrode negative polarity base period Tbn from time t1 to time t2, an electrode negative polarity base current Ibn whose absolute value is smaller than a critical value for negative polarity is applied. During the electrode negative polarity peak period Tpn from time t2 to time t3, an electrode negative polarity peak current Ipn whose absolute value is greater than the critical value is applied. The polarity is reversed at time t3. During the electrode positive polarity peak period Tp from time t3 to time t4, an electrode positive polarity peak current Ip is applied. Then, at time t4 again, the polarity is reversed, and thus the process returns to the electrode negative polarity base period Tbn from time t4 to time t5, and to the electrode negative polarity peak period Tpn from time t5 to time t6. At time t6, the polarity is reversed, and the process goes through the electrode positive polarity peak period Tp from time t6 to time t7. The period from time t2 to time t5 corresponds to one pulse cycle Tf. The period from time t1 to time t3 corresponds to the electrode negative polarity period Ten.

The electrode positive polarity peak period Tp, the electrode positive polarity peak current Ip, the electrode negative polarity peak period Tpn, the electrode negative polarity peak current Ipn and the electrode negative polarity base current Ibn are all preset to appropriate values. Feedback control (arc length control) is performed with respect to the length of the pulse cycle Tf, so that an average of the welding voltage absolute values will be equal to a predetermined voltage. As the pulse cycle Tf varies, the electrode negative polarity base period Tbn varies. In FIG. 4, the electrode negative polarity current ratio Ren is given by the following formula:

$$Ren=((Tpn \cdot |Ipn|+Tbn \cdot |Ibn|)/(Tp \cdot Ip+Tpn \cdot |Ipn|+Tbn \cdot |Ibn|)) \times 100$$

Next, the formation and transfer of a droplet will be described with reference to FIG. 4. Around time t4, that is, the end of the electrode positive polarity peak period Tp, the transfer of a droplet occurs. Then, during the electrode negative polarity base period Tbn from time t4 to time t5, another droplet is formed on the tip of the welding wire. The electrode negative polarity base period Tbn is set to be long enough to provide a desired high electrode negative polarity current ratio Ren. Thus, though the absolute value of the electrode negative polarity base current Ibn is small, the melting of the welding wire tip is facilitated in the electrode negative polarity EN, leading to the droplet formation.

During the electrode negative polarity peak period Tpn from time t5 to time t6, the droplet grows more due to a large current whose absolute value is greater than the critical value. Around the end of the period Tpn, a neck forms in the droplet, but no transfer occurs at this stage due to the large size of the droplet. During the electrode positive polarity peak period Tp from time t6 to time t7, a large current greater than the critical value is applied. As a result, a strong electromagnetic pinch will act on the neck, making the neck much thinner, and finally the transfer of the droplet occurs. The size of the transferring droplet is greater than that of a droplet that would be formed in DC pulse arc welding or in AC pulse arc welding performed with a normal electrode negative current ratio. This large-sized droplet is pushed toward the molten pool by a strong arc force due to the large peak current Ip, and therefore the transfer causes no significant spatter.

As noted above, when the electrode negative polarity current ratio is set to a large value, a droplet is begun to form in the electrode negative polarity base period Tbn, and the size of the droplet to be transferred in a peak period is large. In the light of this, the second embodiment of the present invention provides two successive peak periods, i.e., the electrode negative polarity peak period Tpn and the electrode positive polarity peak period Tp. With such two peak periods opposite in polarity, the transfer of a large-sized droplet can be performed properly.

Further, in the second embodiment, the electrode negative polarity current ratio Ren can be set to a large value more easily by removing the electrode positive polarity base period Tb (see FIG. 1) as well as by employing two peak periods opposite in polarity. In the second embodiment, the ratio Ren is changed by varying the electrode negative polarity peak period Tpn or the electrode negative polarity peak current Ipn or the electrode negative polarity base current Ibn. For setting the electrode negative polarity current ratio Ren to a higher value beyond the normal range, it may be preferable to adjust one or both of the electrode negative polarity peak period Tpn and the electrode negative polarity peak current Ipn.

Figure 5:
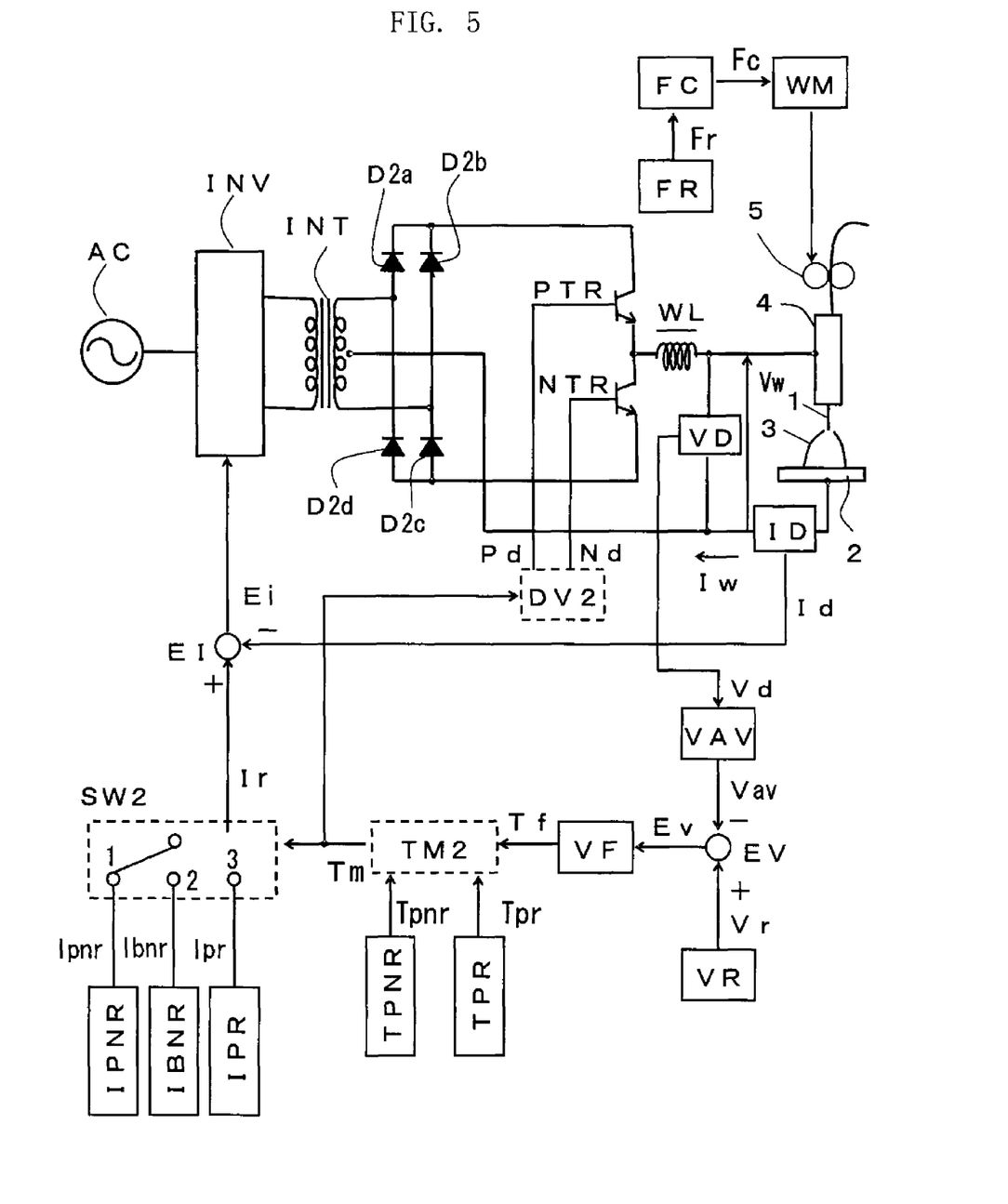
FIG. 5 is a block diagram of a welding power source used for the second embodiment of the present invention.

FIG. 5 is a block diagram of a welding power source for implementing the above-described AC pulse arc welding control method according to the second embodiment of the present invention. In the figure, elements which are identical or similar to those described above with reference to FIG. 2 are indicated by the same reference symbols. As seen from FIG. 5 and FIG. 2, the welding power source used for the second embodiment is basically the same as that used for the first embodiment, but there may be some differences as described below.

Specifically, the timer circuit TM in FIG. 2 is replaced by another timer circuit TM2 indicated by a rectangle of broken lines. Further, the electrode negative polarity base period setting circuit TBNR and the electrode positive polarity base current setting circuit IBR (both shown in FIG. 2) are not used for the second embodiment. The switching circuit SW in FIG. 2 is replaced by another switching circuit SW2 indicated by a rectangle of broken lines, and the drive circuit DV in FIG. 2 is replaced by another drive circuit DV2 indicated by a rectangle of broken lines.

The second timer circuit TM2 receives the pulse cycle signal Tf, the electrode positive polarity peak period setting signal Tpr and the electrode negative polarity peak period setting signal Tpnr as inputs, and outputs, each time the pulse cycle signal Tf makes its momentary level change to High, a timer signal Tm. The timer signal Tm has a value 1 during a period determined by the electrode negative polarity peak period setting signal Tpnr, a value 2 during a period determined by the electrode positive polarity peak period setting signal Tpr, and a value 3 during the subsequent electrode negative polarity base period.

The second switching circuit SW2 receives the timer signal Tm, the electrode positive polarity peak current setting signal Ipr, the electrode negative polarity peak current setting signal Ipnr and the electrode negative polarity base current setting signal Ibnr, and outputs a current setting signal Ir, which is: the electrode negative polarity peak current setting signal Ipnr when the timer signal Tm=1; the electrode positive polarity peak current setting signal Ipr when timer signal Tm=2; and the electrode negative polarity base current setting signal Ibnr when the timer signal Tm=3.

The second drive circuit DV2 receives the timer signal Tm, and outputs: an electrode negative polarity drive signal Nd when the timer signal Tm=1 or 3; and an electrode positive polarity drive signal Pd when the timer signal Tm=2. As a result of these outputs, electrode positive polarity is assigned to the electrode positive polarity peak period, while electrode negative polarity is assigned to the electrode negative polarity peak period and to electrode negative polarity base period.

Figure 6:
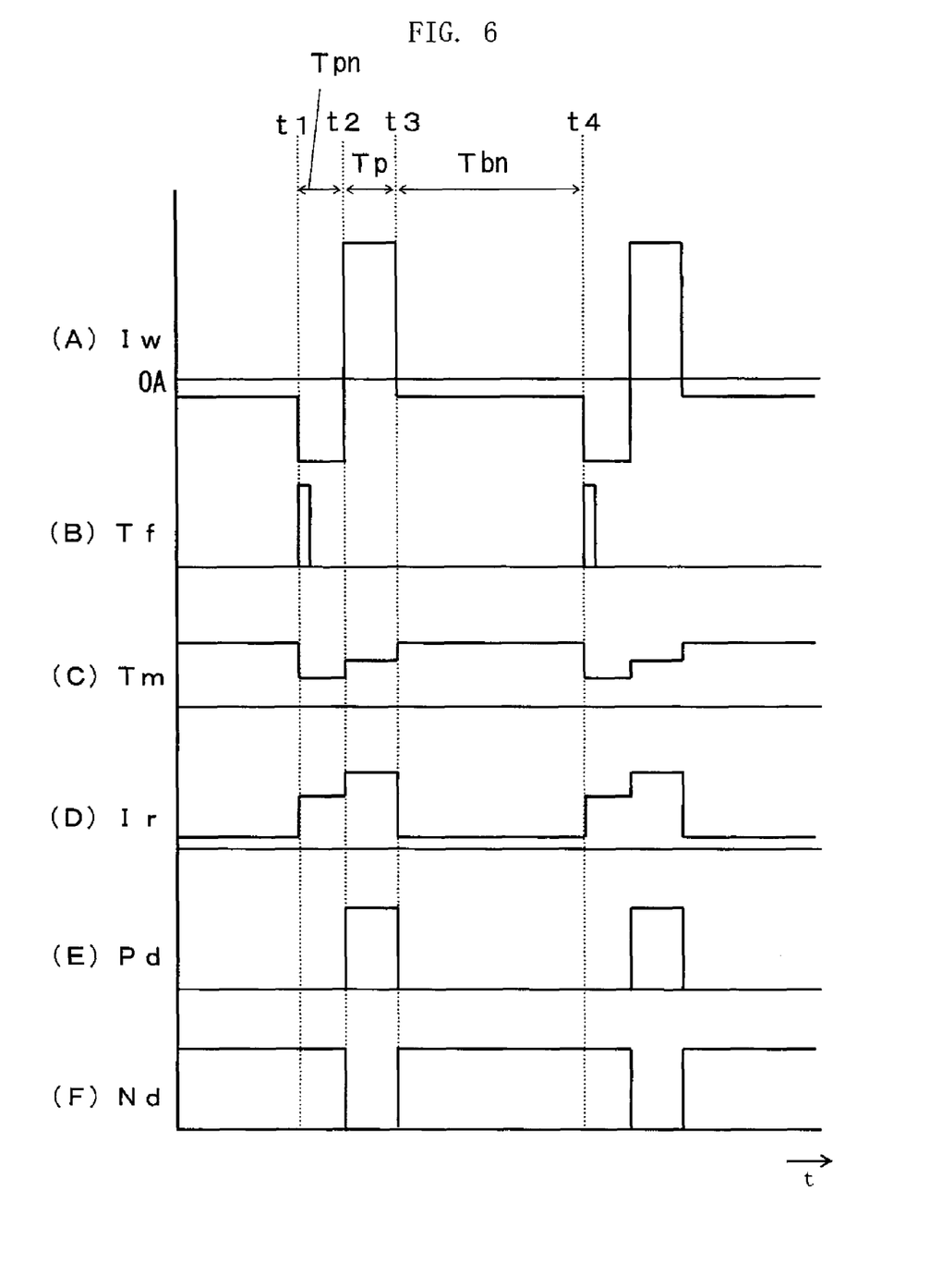
FIG. 6 is a signal timing chart for the welding power source in FIG. 5.

FIG. 6 is a timing chart showing the signals of the welding power source described with reference to FIG. 5. In this figure, (A) shows the welding current Iw, (B) the pulse cycle signal Tf, (C) the timer signal Tm, (D) the current setting signal Ir, (E) the electrode positive polarity drive signal Pd, and (F) the electrode negative polarity drive signal Nd.

As shown in FIG. 6(A), a period before time t1 is an electrode negative polarity base period Tbn; a period from time t1 to time t2 is an electrode negative polarity peak period Tpn; a period from time t2 to time t3 is an electrode positive polarity peak period Tp, a period from time t3 to time t4 is an electrode negative polarity base period Tbn; and a period after time t4 is an electrode negative polarity peak period Tpn. As shown in FIG. 6(B), the pulse cycle signal Tf is a trigger signal which assumes High level instantaneously at time t1 and time t4. The term from time L1 to time t4 represents the pulse cycle. As shown in FIG. 6(C), the timer signal Tm has: a value 1 from time t1 (when the pulse cycle signal Tf assumes High level) for a period determined by the electrode negative polarity peak period setting signal Tpnr in FIG. 5 (from time t1 to time t2); a value 2 from time t2 for a period determined by the electrode positive polarity peak period setting signal Tpr in FIG. 5 (from time t2 to time t3); and a value 3 from time t3 for a period until the pulse cycle signal Tf assumes High level at time t4. Then, the value of the timer signal Tm returns to 1 at time t4. During an electrode negative polarity base period before time t1, the timer signal Tm has a value 3. The change of the values of the timer signal Tm is illustrated by a stepped pattern.

As shown in FIG. 6(D), the current setting signal Ir changes in accordance with the value of the timer signal Tm. Specifically, the value of the current setting signal Ir is equal to that of: the electrode negative polarity base current setting signal Ibnr before time t1; the electrode negative polarity peak current setting signal Ipnr from time t1 to time t2; the electrode positive polarity peak current setting signal Ipr from time t2 to time t3; the electrode negative polarity base current setting signal Ibnr from time t3 to time t4; and the electrode negative polarity peak current setting signal Ipnr for a period after time t4. All the values of the current setting signal Ir are positive.

As shown in FIG. 3(E), the electrode positive polarity drive signal Pd is outputted for the period from time t2 to time t3 and for the period after time t4, to turn on the electrode positive polarity transistor PTR in FIG. 5. As shown in FIG. 6(F), the electrode negative polarity drive signal Nd is outputted for the period before time t2, and for the period from time t3 to time t4, to turn on the electrode negative polarity transistor NTR in FIG. 5.

The second embodiment described above provides the same advantages as the first embodiment. In addition, with the removal of the electrode positive polarity base period, the second embodiment allows the electrode negative polarity current ratio to be set to a higher value than is possible in the first embodiment. Thus, it is possible to perform high-quality welding and form beads with a much lower dilution rate.

Figure 7:
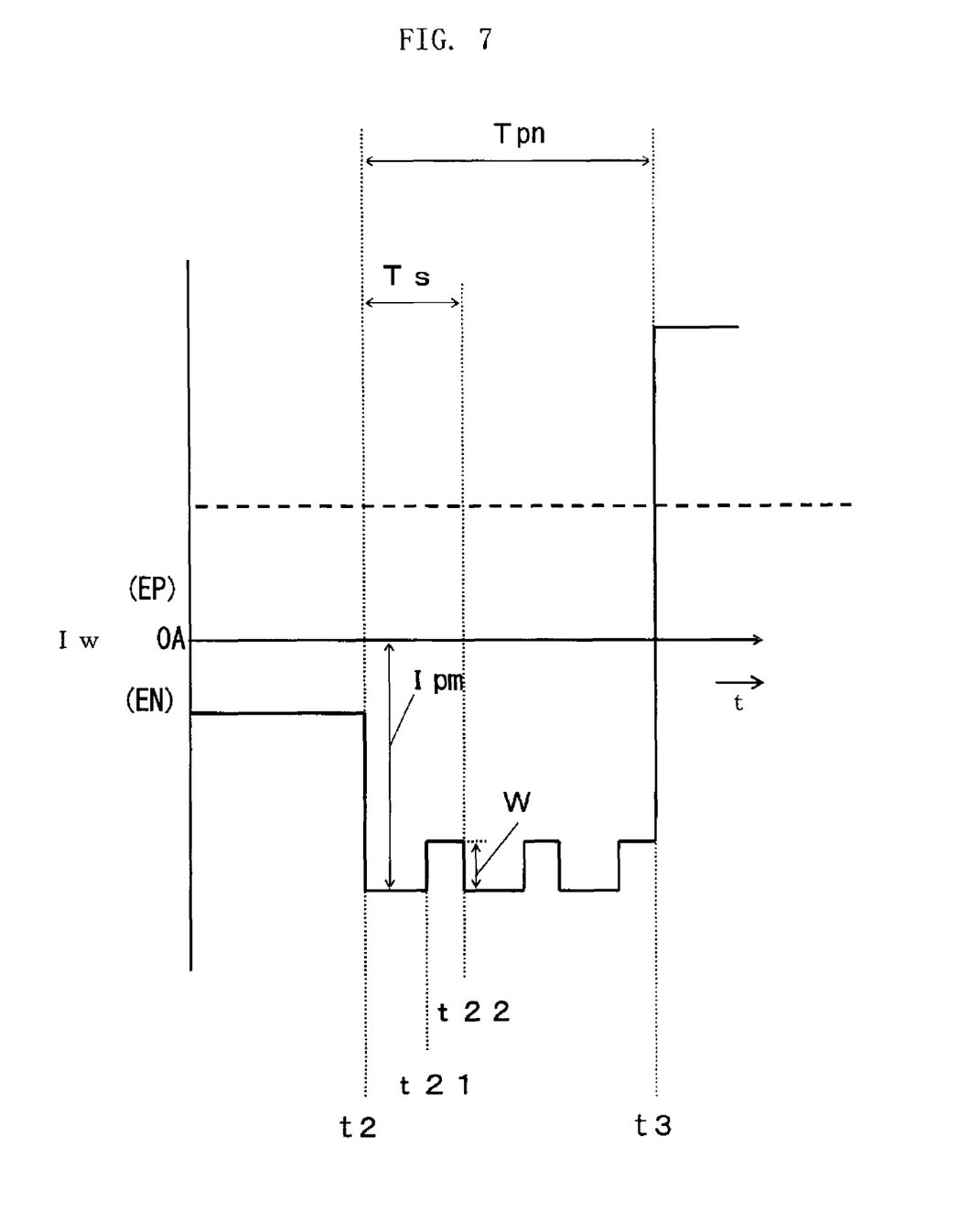
FIG. 7 is a welding current waveform chart for illustrating an AC pulse arc welding control method according to a third embodiment of the present invention.

According to a third embodiment of the present invention, the electrode negative polarity peak current in the above-described first and second embodiments is given oscillations. FIG. 7 illustrates a case where oscillations are given to the welding current Iw in the first embodiment. As shown in the figure, the electrode negative polarity peak current Ipn, applied from time t2 to time t3 during the electrode negative polarity peak period Tpn, has oscillations. Before time t2 is an electrode negative polarity base period Tbn. At time t3 the polarity has reversed, and an electrode positive polarity peak period Tp begins.

At time t2, the electrode negative polarity base period Tbn is switched to an electrode negative polarity peak period Tpn, upon which application of an electrode negative polarity peak current Ipn begins. As shown in FIG. 7, the electrode negative polarity peak current Ipn has an oscillating square waveform with a maximum absolute value of Ipm [A], an amplitude of W [A], and an oscillation cycle of Ts [ms]. The term from time t2 to time t22 represents the oscillation cycle Ts, and the inverse number of the oscillation cycle Ts is an oscillation frequency fs=1/Ts [Hz]. Thus, during the period from time t2 to time t21, an application of the maximum value Ipm takes place, while during the period from time t21 to time t22, an application of the minimum value (Ipm−W) takes place. Here, a duty is defined as: (the application period of the maximum value Ipm/oscillation cycle Ts)×100[%]. With this definition, the duty of the case shown in FIG. 7 is 50%. In the case of FIG. 7, the electrode negative polarity peak current Ipn makes three oscillations during the electrode negative polarity peak period Tpn from time t2 to time t3.

Oscillating the electrode negative polarity peak current Ipn provides the following advantages.

(1) In general, an electrode negative polarity current ratio which is set to a larger value beyond the normal range tends to weaken the stiffness of the arc. Oscillating the electrode negative polarity peak current Ipn enhances the arc stiffness, thereby improving the operability.

(2) The oscillation of the electrode negative polarity peak current Ipn disperses and thereby weakens the upward pushing force that acts on the droplet during the electrode negative polarity peak period Tpn. Accordingly, the spatter generation at the time of droplet transfer is reduced.

(3) Along with the oscillation of the electrode negative polarity peak current Ipn, the droplet also oscillates during the electrode negative polarity peak period Tpn. This ensures smooth droplet transfer.

The amplitude W and the oscillation frequency fs are set to appropriate values, depending on the material and diameter of the welding wire, the type of shielding gas, the feeding rate, etc. so as to maximize the above-described advantages (1) through (3). The amplitude W is selected from a rage of 30 through 200 A, for example, and the frequency fs is selected from a rage of 200 through 500 Hz, for example. FIG. 7 shows a case where the electrode negative polarity peak current Ipn oscillates in a square wave pattern. However, the pattern may be of a sin wave, triangular wave, or saw-teeth wave pattern, for example.

In addition to the above-described advantages (1) through (3), the following advantages can also be enjoyed. When the electrode negative polarity peak period Tpn or the electrode negative polarity peak current Ipn is varied in adjusting the electrode negative polarity current ratio, the arc stiffness and the droplet transfer behavior will also change. Thus, it is a time consuming process to adjust the electrode negative polarity current ratio while keeping the desired arc state. On the other hand, by varying the above-mentioned duty, the average of the electrode negative polarity peak current Ipn is varied, and therefore a fine adjustment can be made to the electrode negative polarity current ratio. In this manner, since only a minor influence is exerted on the arc, it is easy to maintain the arc in the desired state.

Figure 8:
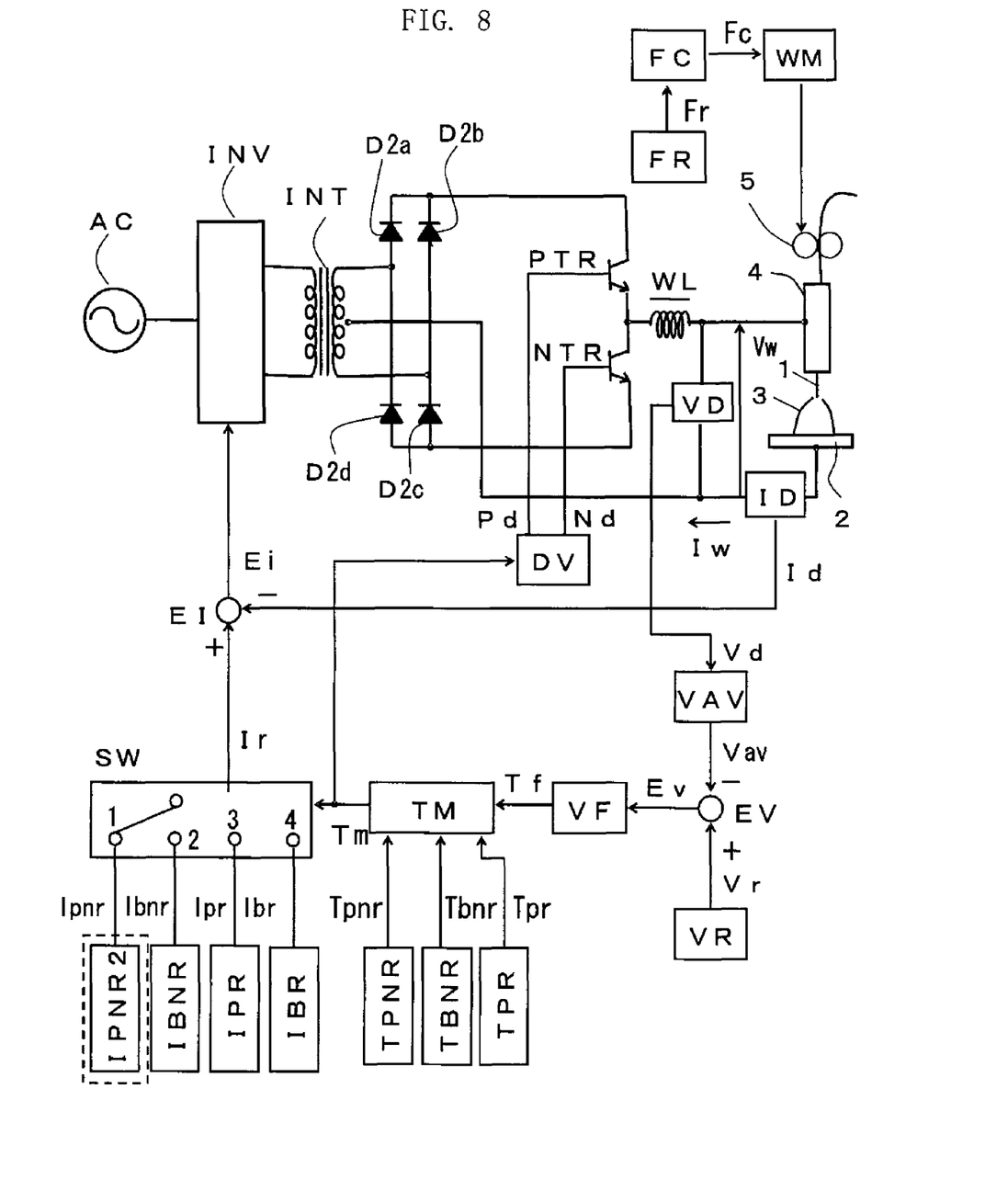
FIG. 8 is a block diagram of a welding power source used for the third embodiment of the present invention.

FIG. 8 is a block diagram of a welding power source for implementing the above-described AC pulse arc welding control method according to of the third embodiment of the present invention. In FIG. 8, elements which are identical or similar to those described with reference to FIG. 2 are indicated by the same reference symbols. As seen from FIG. 8 and FIG. 2, the electrode negative polarity peak current setting circuit IPNR in FIG. 2 is replaced by another electrode negative polarity peak current setting circuit IPNR2 indicated by a rectangle of broken lines. The second electrode negative polarity peak current setting circuit IPNR2 outputs an electrode negative polarity peak current setting signal Ipnr which is an oscillating square wave having a predetermined maximum value, amplitude and duty, and oscillating at a predetermined oscillation frequency.

A timing chart of the signals in the welding power source in FIG. 8 may be basically the same as that of FIG. 3, except that the current setting signal Ir from time t2 to time t3 in FIG. 3(D) has an oscillating pattern corresponding to the above-described electrode negative polarity peak current setting signal Ipnr. In the above embodiment, description is made by assuming that the local oscillation is applied to the arrangements of the first embodiment, but the same may be applied to the arrangements of the second embodiment. In this case, the electrode negative polarity peak current Ipn from time t2 to time t3 shown in FIG. 4 will have an oscillating pattern like that shown in FIG. 7.

The invention claimed is:

1. A control method for AC pulse arc welding performed upon application of cyclic AC welding current to a welding wire and a base metal, one cycle of the welding current including an electrode negative polarity period and an electrode positive polarity period subsequent to the electrode negative polarity period, the method comprising the steps of:
    applying an electrode negative polarity base current for forming a droplet on an end of the welding wire and a subsequent electrode negative polarity peak current for making the droplet bigger during the electrode negative polarity period, the electrode negative polarity base current having an absolute value smaller than a first critical value, the electrode negative polarity peak current having an absolute value greater than the first critical value; and
    applying an electrode positive polarity peak current during the electrode positive polarity period that causes the droplet made bigger by applying the subsequent electrode negative polarity peak current to transfer from the welding wire to the base metal, the electrode positive polarity peak current having a value greater than a second critical value.

2. The control method according to claim 1, wherein at least one of the electrode negative polarity peak period and the electrode negative polarity peak current is adjusted for varying an electrode negative polarity current ratio.

3. The control method according to claim 2, wherein the electrode negative polarity peak current comprises an oscillating current having a predetermined amplitude and a predetermined oscillation frequency.

4. The control method according to claim 3, wherein the electrode negative polarity peak current has a square-shaped oscillation waveform.

5. The control method according to claim 1, wherein the electrode negative polarity peak current comprises an oscillating current having a predetermined amplitude and a predetermined oscillation frequency.

6. The control method according to claim 5, wherein the electrode negative polarity peak current has a square-shaped oscillation waveform.

7. A control method for AC pulse arc welding performed upon application of cyclic AC welding current, one cycle of the welding current including an electrode negative polarity period and an electrode positive polarity period subsequent to the electrode negative polarity period, the method comprising:
    applying an electrode negative polarity base current and a subsequent electrode negative polarity peak current during the electrode negative polarity period, the electrode negative polarity base current having an absolute value smaller than a first critical value, the electrode negative polarity peak current having an absolute value greater than the first critical value;
    applying an electrode positive polarity peak current during the electrode positive polarity period, the electrode positive polarity peak current having a value greater than a second critical value; and
    applying an electrode positive polarity base current subsequent to the electrode positive polarity peak current during the electrode positive polarity period, wherein the electrode positive polarity base current has a value smaller than the second critical value.

8. The control method according to claim 7, wherein at least one of the electrode negative polarity peak period and the electrode negative polarity peak current is adjusted for varying an electrode negative polarity current ratio.

9. The control method according to claim 8, wherein the electrode negative polarity peak current comprises an oscillating current having a predetermined amplitude and a predetermined oscillation frequency.

10. The control method according to claim 9, wherein the electrode negative polarity peak current has a square-shaped oscillation waveform.

11. The control method according to claim 7, wherein the electrode negative polarity peak current comprises an oscillating current having a predetermined amplitude and a predetermined oscillation frequency.

12. The control method according to claim 11, wherein the electrode negative polarity peak current has a square-shaped oscillation waveform.

* * * * *